Inventor:
Wesley W. Brooks,
by Henry J. Marcinko
Attorney.

Inventor:
Wesley W. Brooks,
by Henry J. Marciniak
Attorney.

3,080,503
BALLAST APPARATUS FOR STARTING AND OPERATING GASEOUS DISCHARGE LAMPS

Wesley W. Brooks, Danville, Ill., assignor to General Electric Company, a corporation of New York
Filed June 1, 1961, Ser. No. 114,119
9 Claims. (Cl. 315—187)

This invention relates to ballast apparatus for starting and operating gaseous discharge lamps. More particularly, it relates to ballast apparatus for starting and operating two or more gaseous discharge lamps such as fluorescent lamps, wherein the lamps are sequentially started and a capacitive reactor is utilized in the starting circuit.

In a commonly used ballast circuit two fluorescent lamps are serially connected across the primary and secondary winding of a high reactance transformer by a circuit means which includes a pair of output leads and are operated in series. Generally, it is the practice in such ballast circuits to employ a starting capacitor connected in shunt with one of the lamps so that the output of the ballast transformer is initially applied to the other lamp to start the lamps in sequence. As an example, in a conventional ballast for operating two rapid start 40 watt lamps, a capacitor having a capacitance of approximately .05 microfarad is connected across the lamp which is the last to be ignited in sequence.

Before the lamps are started they present a substantial impedance in the ballast circuit. In effect, an open circuit condition exists across the terminals to which the lamps are connected. The starting capacitor causes the voltage output of the ballast transformer to be initially applied to the lamp which is not shunted by the starting capacitor. When this lamp is ignited, the lamp presents a very low impedance and current flows through the lamp and consequently through the starting capacitor. Since the starting capacitor presents a relatively greater impedance than the ignited lamp, most of the voltage output of the ballast transformer appears across the starting capacitor. This voltage appears across the lamp which the starting capacitor shunts and is sufficient to start the shunted lamp. After the shunted lamp is ignited, the impedance presented by the shunted lamp is so low as compared with the impedance of the ignited lamp that the starting capacitor is now in effect short circuited.

One of the disadvantages of such a conventional starting arrangement is that an additional capacitor is required in the ballast circuit. The capacitors employed in a ballast apparatus represent an appreciable part of the cost, and it is desirable, therefore, to eliminate the need for a separate starting capacitor in a fluorescent lamp ballast apparatus.

Accordingly, it is the general object of my invention to provide a new and improved starting circuit arrangement for a ballast apparatus for operating two or more gaseous discharge lamps.

Another object of my invention is to provide a new and improved starting circuit arrangement in a ballast apparatus for operating two or more lamps wherein the need for a starting capacitor is eliminated.

In accordance with one aspect of my invention, I have provided an improved ballast apparatus for operating two or more gaseous discharge lamps whereby the lamps are sequentially started without need for employing a separate starting capacitor. The ballast apparatus includes a transformer and a series capacitor connected in circuit with the secondary winding thereof. The series capacitor has a capacitor roll comprised of a pair of foil electrodes having layers of insulating paper and impregnated with a dielectric, the dielectric and the capacitor roll being enclosed in an electrically conductive capacitor case. It was found in accordance with the invention that the capacitance required in the starting circuit may be provided by connecting the capacitor case in electrical circuit with one of the electric leads provided for connection across the lamp which is shunted during starting. The capacitance between the capacitor case and the outer foil layer of the capacitor roll is thereby placed in shunt with at least one of the lamps and functions in effect, as a starting capacitor.

The subject matter which I regard as my invention is particularly pointed out and distinctly claimed in the concluding portion of this specification. My invention, however, both as to organization and mode of operation, together with further objects and advantages thereof, may be best understood by referring to the following description taken in conjunction with the accompanying drawing in which:

Figure 1:
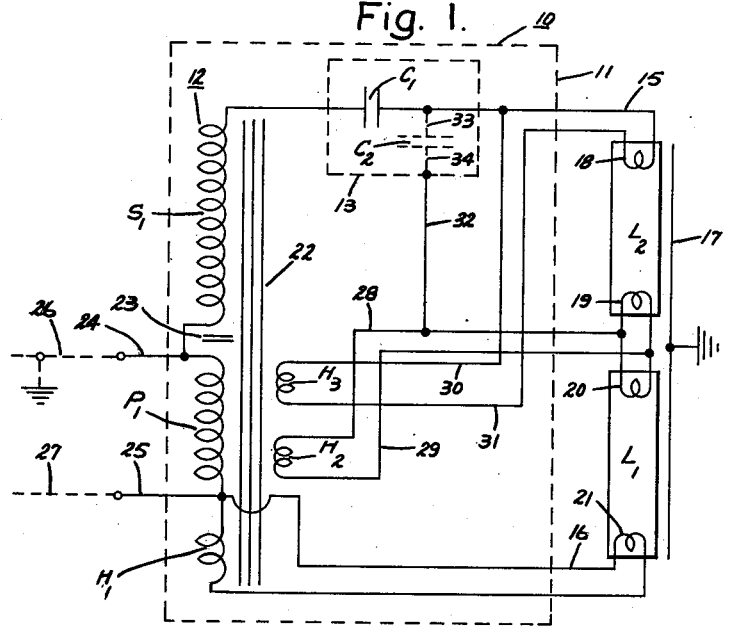
FIG. 1 is a schematic circuit diagram of a ballast apparatus for operating a pair of gaseous discharge lamps embodying one form of the present invention.

Referring now to the drawings and more specifically to FIG. 1, I have illustrated therein a schematic circuit diagram of a ballast apparatus 10 for operating a pair of hot cathode type of fluorescent lamps $L_1$ and $L_2$. The ballast apparatus 10 is contained within a ballast case 11 represented schematically by the dashed rectangle. The ballast apparatus 10 includes a high reactance transformer 12, a series capacitor $C_1$ enclosed in an electrically conductive capacitor case 13 and a pair of output leads 15, 16. A grounded conductive plate 17 is shown schematically as a line disposed adjacent to the lamps $L_1$, $L_2$. In most applications, a lighting fixture serves as the conductive plate 17, and the lamps $L_1$ and $L_2$ are positioned in proximity thereto so as to be capacitively coupled with electrodes 18, 19, 20 and 21.

The high reactance ballast transformer 12 has a magnetic core 22, a primary winding $P_1$, a secondary winding $S_1$, cathode heating windings $H_1$, $H_2$, $H_3$, a magnetic shunt 23 and input terminal leads 24, 25. The input terminal leads 24, 25 are connected across primary winding $P_1$ and are provided for connecting the ballast apparatus 10 to a suitable alternating current supply, such as a 120 volt, 60 cycle supply, shown schematically by dashed lines 26, 27, the grounded side of the power supply being identified by the grounded connection.

In order to supply a continuous heating current to filament 21 of lamp $L_1$, cathode heating winding $H_1$ is provided. It is an extension of the primary winding $P_1$ and is closely coupled therewith. Cathode heating winding $H_2$ is also closely coupled with the primary winding $P_1$ and is connected in circuit with filaments 19, 20 of lamps $L_1$ and $L_2$ by leads 28, 29. Cathode heating winding $H_3$ is connected in circuit with filament 18 of lamp $L_2$ by means of the electrical leads 30, 31 and 15.

As shown in FIG. 1, it will be noted that the capacitor case 13 is represented schematically by the dashed rectangle. The capacitor case 13 is connected by means of lead 32 in circuit with electrical lead 28. The reactive impedance developed between the capacitor case 13 and the capacitor outer foil of the capacitor $C_1$ is represented schematically by a capacitor $C_2$ and connections 33, 34 shown in dashed lines. It was found that by connecting the capacitor case 13 in circuit with lead 28 was equivalent to connecting a capacitor $C_2$ in shunt with lamp $L_2$. It was found further that the capacitance of capacitor $C_2$ was sufficient for the purpose of initially shunting lamp $L_2$ and causing the voltage across the primary winding $P_1$ and the secondary winding $S_1$ to be applied initially across lamp $L_1$ until it is ignited. This voltage is sufficient to cause lamp $L_1$ to be ignited. After lamp $L_1$ is ignited, the voltage drop resulting from the capacitive impedance between the capacitor case 13 and the capacitor roll is sufficient to ignite lamp $L_2$. After lamps $L_1$ and $L_2$ are ignited, the transformer 12 provides the operating voltage required for the two serially connected lamps.

Figure 2:
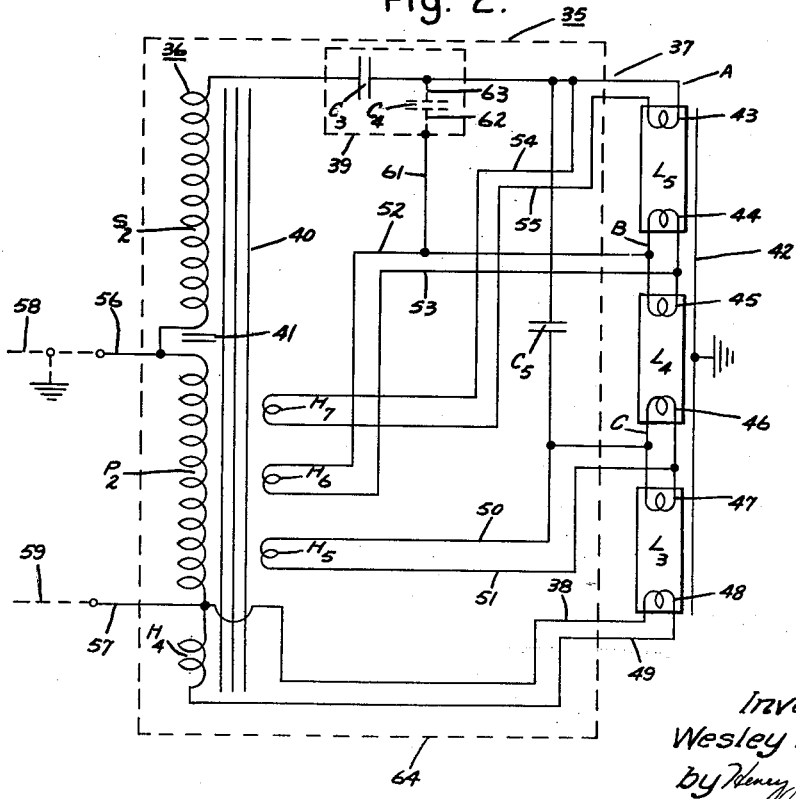
FIG. 2 is a schematic circuit diagram of a ballast apparatus illustrating another embodiment of the invention wherein an improved ballast apparatus is provided for starting and operating three gaseous discharge lamps.

In FIG. 2, I have illustrated a ballast apparatus 35 for sequentially starting and operating three serially connected lamps $L_3$, $L_4$ and $L_5$. The ballast apparatus 35 includes a high reactance transformer 36, a series capacitor $C_3$ and a pair of output leads 37, 38. The series capacitor $C_3$ which may be used in accordance with the invention has a conductive or metallic capacitor case 39 which is filled with a dielectric and hermetically seals a capacitor roll. The series capacitor $C_3$ introduces sufficient capacitive reactance into the ballast circuit 35 as compared with the inductive reactance of the transformer 36 so that a leading current is caused to flow to the lamps $L_3$, $L_4$, $L_5$ during operation.

The high reactance transformer 36 is comprised of a primary winding $P_2$, a magnetic core 40, a secondary winding $S_2$ inductively coupled with said primary winding $P_2$, a magnetic shunt 41 and the cathode heating windings $H_4$, $H_5$, $H_6$ and $H_7$ which are closely coupled with the primary winding $P_2$. As shown in FIG. 2, the magnetic shunt 41 is shown schematically by the two horizontal lines interposed between the primary winding $P_2$ and the secondary winding $S_2$.

It will be appreciated that the leakage reactance of a transformer can be readily varied by the inclusion of a high reluctance leakage path or by placing shunts of magnetic material between a primary winding and a secondary winding of a transformer. In the illustrated embodiment of the invention as shown in FIGS. 1 and 2, shunts of magnetic material provided the flux leakage path between the windings. It will be understood, however, that this leakage path may be provided by nonmagnetic material, such as air, or through magnetic material by employing a metallic shunt.

Continuing with the description of the ballast apparatus 35 as shown in FIG. 2, it will be noted that the lamps $L_3$, $L_4$ and $L_5$ are located in proximity to a grounded conductive plate or fixture 42 so that the cathodes 43, 44, 45, 46, 47 and 48 are capacitively coupled with the conductive plate 42. It will be understood that where lamps are mounted in separate fixtures that the separate grounded fixtures may be employed to serve as the conductive plate 42, which is shown as a single part disposed adjacent to lamps $L_3$, $L_4$, $L_5$.

Cathode heating winding $H_4$ which is an extension of the primary winding $P_2$ is connected in circuit with the cathode 48 of lamp $L_3$ by electrical leads 38 and 49. Electrical leads 50 and 51 connect the cathode heating winding $H_5$ in circuit with lamp cathodes 46 and 47. Similarly, electrical leads 52 and 53 connect cathode heating winding $H_6$ in circuit with the filaments 44, 45. Lamp cathode 43 of lamp $L_5$ is provided with heating current by cathode heating winding $H_7$ which is connected in circuit therewith by electrical leads 54, 55, 37. Thus, lamp cathodes 43, 44, 45, 46, 47 and 48 are continuously provided with heating current so long as the primary winding $P_2$ of the transformer 36 is energized.

In order to connect the transformer 36 in circuit with an external alternating current power source, a pair of input terminal leads 56, 57 connected across the primary winding $P_2$ are provided. The input terminal leads 56, 57 may be connected to a suitable alternating current source for which the ballast apparatus 35 is designed. The alternating current source is shown schematically in FIG. 2 by the dashed lines 58, 59, the grounded supply line being identified by the grounded connection.

As is shown schematically in FIG. 2, the capacitor case 39 of the series capacitor $C_3$ is connected in circuit with electrical lead 52 by means of the lead 61 so that the capacitance between the metallic capacitor case 39 and the capacitor roll is, in effect, connected in shunt with lamp $L_5$. This capacitance is represented symbolically by capacitor $C_4$ and the dashed line connections 62 and 63. A starting capacitor $C_5$ is connected in shunt with lamps $L_4$ and $L_5$ so that the output of the transformer 36 is initially applied across lamp $L_3$ which is the first lamp to start in sequence. After lamp $L_3$ is ignited, the capacitance between the capacitor case 39 and the capacitor roll causes the output of the transformer 36 to be applied essentially across lamps $L_3$ and $L_4$. Thus, lamp $L_4$ is the next lamp that is ignited in sequence, lamp $L_5$ being the last lamp to ignite.

It will be understood that, although I have schematically shown the starting capacitor $C_5$ in FIG. 2 as a separate capacitor, the starting capacitor $C_5$ may be included in the same container as the series capacitor $C_3$, as is frequently done in the ballast circuit applications. Thus, a capacitor case normally housing both a series capacitor and a starting capacitor, would be connected in the same manner by joining the common capacitor case in electrical circuit with the lamp that is to be shunted so that the reactive impedance between the capacitor case and the capacitor roll is connected across the lamp.

Figure 3:
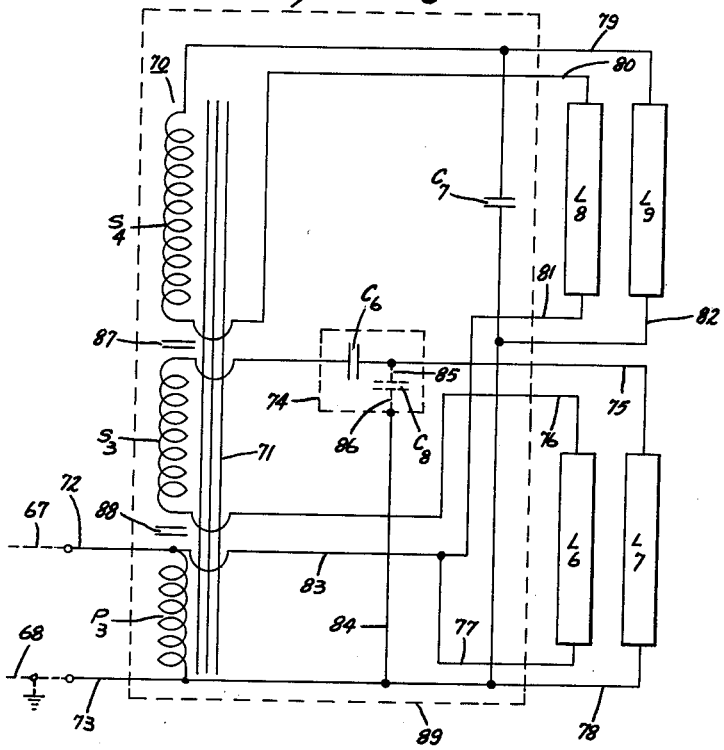
FIG. 3 is a schematic circuit diagram of an improved ballast apparatus for operating four instant start lamps in accordance with the invention.

In FIG. 3 I have illustrated a ballast apparatus 69 incorporating the invention for starting and operating four rapid start type of lamps $L_6$, $L_7$, $L_8$, $L_9$. In the interest of clarity the cathode heating windings have been omitted. It will be understood that the conductive plates which are usually disposed in capacitive relation with the lamp filaments, discharge resistors and radio interference suppression capacitors which may be used in such circuits have also been omitted in the schematic diagram shown in FIG. 3.

A high reactance ballast transformer 70 having a primary winding $P_3$, a pair of secondary windings $S_3$, $S_4$ inductively coupled with the primary winding $P_3$ on a magnetic core 71 provides the starting and operating voltages. The primary winding $P_3$ is connected across a pair of input terminal leads 72, 73 which are provided for connection across a suitable alternating current source shown schematically by the dashed lines 67, 68. The lamps $L_6$ and $L_7$ are included in a lamp circuit which includes the primary winding $P_3$, secondary winding $S_3$, a series capacitor $C_6$ having a metallic case 74, and electrical leads 75, 76, 77 and 78 which connect lamp $L_6$ and $L_7$ in circuit with the primary winding $P_3$ and the secondary winding $S_3$. It will be noted that lamps $L_8$, $L_9$ are connected in a second lamp circuit by means of electrical leads 79, 80, 81, and 82. The second lamp circuit includes the primary winding $P_3$, the secondary winding $S_4$ and a starting capacitor $C_7$.

Continuing now with a more detailed description of the first lamp circuit, it will be seen that the first lamp circuit is comprised essentially of a closed loop. Starting with the lower end of the primary winding $P_3$, the loop includes electrical lead 78, lamp $L_7$, electrical lead 75, secondary winding $S_3$, electrical lead 76, lamp $L_6$, electrical leads 77, 83 and the primary winding $P_3$. Lamps $L_8$ and $L_9$ are included in a lamp circuit or loop which includes a portion of lead 78, lead 82, lamp $L_9$, electrical lead 79, secondary winding $S_4$, electrical lead 80, lamp $L_8$, electrical leads 81, 83 and primary winding $P_3$. To place the capacitance which exists between the capacitor case 74 and the outer foil of the capacitor roll in electrical circuit across lamp $L_7$, the capacitor case 74 is connected in electrical circuit with lead 78 by means of lead 84. This capacitance is represented schematically by capacitor $C_8$ shown connected in circuit by dashed lines 85, 86.

The transformer 70 in the illustrative embodiment of the invention shown in FIG. 3 includes the magnetic shunts 87, 88, which provide a flux leakage path between the windings and may be comprised of nonmagnetic material, such as air, or magnetic material, such as core steel. The transformer 70 and the other components of the ballast apparatus 69 are potted in a suitable potting compound, such as a mixture of sand and asphalt, and are enclosed in a metallic ballast case 89, which is represented schematically by the dashed rectangle.

The series capacitors used in the illustrative embodiments of the invention provide sufficient capacitive reactance as compared with the inductive reactance of ballast transformer so that a leading current is caused to flow through the secondary winding thereof when the transformer is energized.

Figure 4:
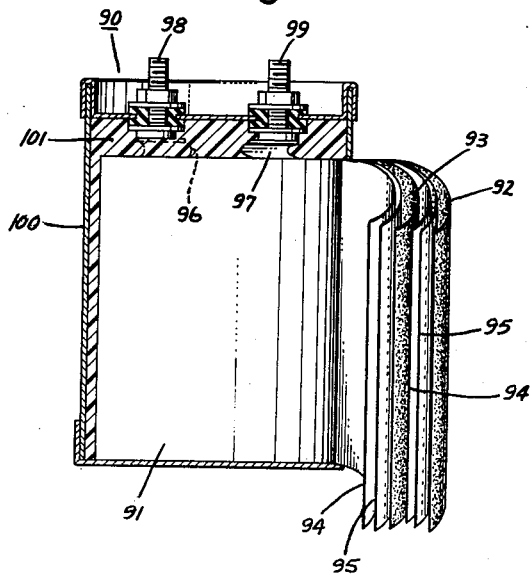
FIG. 4 is a view partly in section of a capacitor of a type generally employed in ballast circuits, the capacitor roll being partially unrolled.

In FIG. 4, a capacitor assembly 90 is illustrated and includes a capacitor roll comprised of metallic foil electrodes 92 and 93 which have interleaved therebetween paper insulating layers 94, 95. The metallic foil electrodes 92, 93 correspond to the plates of the capacitors $C_1$, $C_3$, $C_6$ shown schematically in FIGS. 1, 2 and 3 by the parallel spaced lines. Tap straps 96, 97 are brought out from the electrodes 92, 93 and connected to the outer terminals 98, 99. The capacitor case 100 is filled with a dielectric 101. The capacitor roll 91 and dielectric 101 are hermetically sealed by the capacitor case 100. It was found that the capacitive reactance which exists between the capacitor case 100 and the outer foil layer of the foil electrode 92 is sufficient to provide the capacitance required in a lamp starting circuit. Although a two terminal type of capacitor is illustrated, it will be apparent that the invention is applicable to ballast circuits employing three terminal type of capacitors wherein two capacitors are contained in a single capacitor case.

The operation of the ballast apparatus 10 shown schematically in FIG. 1 will now be more fully explained. When a voltage is applied across the input terminal lead 24, 25 by connecting them in circuit with supply lines 26, 27, a voltage will be induced in the secondary winding $S_1$. The magnitude of this voltage will depend on the turns ratio of the primary winding $P_1$ and the secondary winding $S_1$. Voltages are also induced in the cathode heating windings $H_1$, $H_2$, $H_3$ and a cathode heating current is supplied to cathodes 18, 19, 20, 21 of lamps $L_1$ and $L_2$. The open circuit voltage developed across the primary $P_1$ and the secondary winding $S_1$ of the ballast transformer 12 is applied across lamp $L_1$ because of the shunting action of the capacitive reactance $C_2$. Also, as an auxiliary starting aid current flows between the cathode 20 and conductive plate 17, a return path for the auxiliary starting aid current is provided by the grounded connection of supply line 26.

After lamp $L_1$ has ignited, it conducts current. Therefore, a current now flows through the capacitor case 13 and a voltage sufficient to start lamp $L_2$ is developed between the case 13 and outer foil of capacitor $C_1$. Lamp $L_2$ being in close proximity to the conductive plate 17, is also aided in starting by an auxiliary starting aid current flow which ionizes the gas in the vicinity of cathode 20. Lamp $L_2$ is rendered conductive, and the voltage across the lamp $L_2$ causes a breakdown of the gas contained therein whereby lamp $L_2$ is ignited. The capacitance between the capacitor case 13 and the outer foil of the series capacitor $C_1$ is sufficiently low that no significant current will flow through the capacitor case 13 after lamps $L_1$, $L_2$ are ignited in view of the low impedance path provided by lamps $L_1$, $L_2$. It will be seen that lamps $L_1$ and $L_2$ are operated in series circuit relation across the primary winding $P_1$ and the secondary winding $S_1$.

Referring now to the ballast circuit 35 shown in FIG. 2, it will be seen that the transformer 36 is energized by connecting the input terminal leads 56, 57 in electrical circuit with supply lines 58, 59. Voltages are induced in the secondary winding $S_2$ and the cathode heating windings $H_4$, $H_5$, $H_6$, $H_7$. At this instant points A, B and C are at a peak voltage equal to the peak open circuit voltage. Due to the capacitive coupling between the lamp cathode and the conductive plate 42 an electron flow may be initiated between the cathodes and the conductive plate 42 causing ionization of the gas in the vicinity of the cathodes. Since the impedance of the ionized gas in the lamp is relatively low, as the gas progressively ionizes, the peak voltage is substantially applied across the length of the lamp. In a similar manner, lamps $L_4$ and $L_5$ are simultaneously ionized.

In order to ignite the lamps it is necessary that a predetermined minimum root mean square voltage be applied across the several lamps $L_3$, $L_4$ and $L_5$. Since points A, B and C are at the same potential and since output lead 38 connected to lamp $L_3$ is at ground potential during each alternate half cycle of the power supply, a voltage drop occurs across lamp $L_3$. This open circuit voltage is sufficient to bring lamp $L_3$ over the so-called hump of the lamp volt-ampere characteristic curve and cause the lamp to be ignited and operated in the region of negative resistance. At the instant lamp $L_3$ is ignited and conducts current, the voltage across lamp $L_3$ decreases and a voltage drop occurs across lamp $L_4$ since current now flows through starting capacitor $C_5$. This voltage drop is sufficient to ignite lamp $L_4$. After lamp $L_4$ ignites, a substantial portion of the open circuit voltage is applied to lamp $L_5$, and conduction of current of lamp $L_5$ is initiated. It will, therefore, be seen that the lamps $L_3$, $L_4$, $L_5$ are operated in series circuit relation across the primary winding $P_2$ and the secondary winding $S_2$ of transformer 36.

Although I have attempted to explain herein the manner in which the starting capacitors function, it will be appreciated that the precise manner and mode of starting is not fully understood. It is believed that the starting capacitors essentially adjust the instantaneous time at which the lamps are brought into the region of negative resistance so that the times do not coincide.

The four lamp ballast circuit shown in FIG. 3 is energized by connecting the input terminal leads 72, 73 in circuit with a suitable alternating current source, such as is provided by the supply lines 67, 68. Voltages are simultaneously induced in the secondary windings $S_3$ and $S_4$. In the first lamp circuit, which includes lamps $L_6$ and $L_7$, the capacitance between capacitor case 74 and the outer foil of the capacitor roll of capacitor $C_6$ causes lamp $L_6$ to initially go over the hump of the volt-ampere characteristic curve of the lamp used. In the second lamp circuit, which includes lamps $L_8$ and $L_9$, the starting capacitor $C_7$ similarly causes lamp $L_8$ to initially go over the hump of the volt-ampere characteristic curve. It will be noted that lamps $L_6$ and $L_7$ are operated in series circuit relation in one lamp circuit while lamps $L_8$ and $L_9$ are operated in series circuit relation in the other lamp circuit.

From the foregoing description it will be apparent that the advantages of the invention can be achieved generally in ballast circuits where a starting capacitor would normally be employed to start two or more gaseous discharge lamps. The present invention makes it possible to obtain reliable starting of at least two gaseous discharge lamps without the need for employing a separate starting capacitor.

Although I have illustrated my invention by specific embodiments thereof, it will be apparent that the invention has general applicability in ballast circuits for operating two or more gaseous lamps in a lead circuit wherein at least one capacitor having a conductive metallic case is utilized in the ballast circuit.

Thus, it will be apparent to those skilled in the art that the starting circuit arrangement in accordance with the invention can be adapted to many other ballast circuits.

While the present invention has been described by reference to specific exemplifications thereof, it is to be understood and specific modifications may be made by those skilled in the art without actually departing from the invention. It is, therefore, intended in the appended claims to cover all such equivalent variations that fall within the true spirit and scope of the invention.

What I claim as new and desire to secure by Letters Patent of the United States is:

1. A ballast apparatus for starting and operating at least a pair of gaseous discharge lamps from an alternating current supply comprising a transformer having a magnetic core, a primary winding and a secondary winding inductively coupled therewith, a pair of input terminal leads connected across said primary winding, a capacitor connected in series circuit relationship with said secondary winding, said capacitor including a capacitor roll having an outer foil and disposed in an electrically conductive case filled with a dielectric material, circuit means including electrical leads for applying the output of said transformer across said pair of lamps and for connecting the capacitance developed between said conductive case and the outer foil of said capacitor in shunt across one of said lamps to aid in starting said pair of lamps.

2. A ballast apparatus for starting and operating at least a pair of gaseous discharge lamps from an alternating current supply comprising a pair of input terminal leads for connection with the alternating current supply, a ballast means, a capacitor having a capacitor roll disposed in an electrically conductive case filled with dielectric material, circuit means connecting said input terminal leads in circuit with said ballast means and said capacitor, and for connection across said lamps, said circuit means including electrical leads for connecting said electrically conductive case in circuit with one of the lamps so that the capacitance developed between the conductive case and the capacitor roll of said capacitor is placed in shunt across one of the lamps to aid in starting said pair of lamps.

3. A ballast apparatus for starting and operating at least a pair of fluorescent lamps from an alternating current supply, said apparatus comprising a pair of input terminal leads for connection across the alternating current supply, a series capacitor, a ballast means, said capacitor including a capacitor roll disposed in an electrically conductive case filled with dielectric material, circuit means connecting said input terminal leads, said ballast means and said capacitor in circuit so that said ballast means limits the current supplied to said lamps and said capacitor causes a leading current to flow to the lamps, said circuit means including electrical leads for connecting the electrically conductive case in circuit with one of said lamps so that the capacitance between said conductive case and the capacitor roll is connected in shunt across one of said lamps to aid in starting said pair of lamps.

4. A ballast apparatus for starting and operating at least a pair of fluorescent lamps from an alternating current supply, said apparatus comprising a high reactance transformer including a magnetic core, a primary winding, at least one high reactance secondary winding inductively coupled therewith on said magnetic core, a pair of input terminal leads for connection across said alternating current supply, said primary winding being connected across said input terminal leads, a series capacitor connected in series circuit relation with said secondary winding, said series capacitor being formed of a capacitor roll and having a conductive case enclosing said capacitor roll and being filled with a dielectric, said conductive case being disposed in capacitive relation with said capacitor roll, said capacitance between said conductive case and said capacitor roll being sufficient to aid in starting said lamps, circuit means including electrical leads for connecting said lamps in circuit to apply the output of said high reactance transformer across said lamps and for connecting said conductive case in circuit with one of said lamps so that the capacitance between said conductive case and capacitor roll is connected in shunt with one of said lamps to aid in starting said lamps.

5. The ballast circuit set forth in claim 4 wherein said secondary winding is connected in autotransformer relationship with said primary winding.

6. A ballast apparatus for starting and operating at least a pair of serially connected gaseous discharge lamps from an alternating current supply, said apparatus comprising a high reactance transformer having a magnetic core, a primary winding and at least one high leakage reactance secondary winding inductively coupled therewith, a pair of input terminal leads for connection across the alternating current supply, said primary winding being connected across said input terminal leads, a first output lead and a second output lead for connection across the serially connected lamps, a series capacitor, said series capacitor being connected in circuit with said first output lead and in series circuit relation with said secondary winding, said second output lead being connected in circuit with one end of said primary winding, said series capacitor including a capacitor roll enclosed within an electrically conductive case filled with a dielectric so that a capacitance is developed between said conductive case and said capacitor roll, circuit means connecting said conductive case in circuit with one of said lamps so that the capacitance between said conductive case and said capacitor roll is placed in shunt across one of said lamps to aid in starting said lamps.

7. A ballast apparatus for starting and operating at least a pair of hot cathode fluorescent lamps from an alternating current supply, said apparatus comprising a high reactance transformer having a magnetic core, a primary winding and at least one secondary winding inductively coupled therewith on said magnetic core, a plurality of cathode heating windings closely coupled with said primary winding, a pair of input terminal leads for connection to the alternating current supply, said primary winding being connected across said input terminal leads, a series capacitor connected in series circuit relationship with said secondary winding, said series capacitor having an electrically conductive case and a capacitor roll disposed therein, said metallic case being filled with dielectric and spaced from said capacitor roll thereby providing a capacitance therebetween, circuit means for connecting said conductive case in circuit with one of the lamps so that said capacitance is connected in shunt across said one of the lamps, and circuit means for connecting the output of said high reactance transformer across said lamps and for connecting said cathode heating windings in circuit with said lamps to provide a heating current thereto.

8. A ballast apparatus for starting and operating four gaseous discharge lamps from an alternating current source, said apparatus comprising a high reactance transformer having a magnetic core, a primary winding, a first secondary winding and a second secondary winding inductively coupled with said primary winding on said magnetic core, a series capacitor connected in series circuit relation with at least one of said secondary windings to cause a leading current to flow therethrough, said series capacitor having an electrically conductive case and a capacitor roll disposed therein, said metallic case being spaced from said capacitor roll and developing a capacitance therebetween, a first circuit means for connecting a pair of said lamps in a first lamp operating circuit including said series capacitor so that at least the voltage of said first secondary winding is applied across said lamps, said circuit means including electrical leads for connecting said conductive case across one of said lamps so that said capacitance is connected across one of said lamps to aid in starting said lamps, a second circuit means for connecting the other pair of said lamps in a second lamp operating circuit so that at least the voltage of said second secondary winding is applied across said lamps, said second circuit means including a starting capacitor and electrical leads for connecting said starting capacitor across one of said lamps.

9. A ballast apparatus for starting and operating at least a pair of gaseous discharge lamps from an alternating current source, comprising a high reactance transformer having a magnetic core, a primary winding for connection across said alternating current source and at least one secondary winding inductively coupled with said primary winding, a series capacitor connected in series circuit relation with said secondary winding, said series capacitor having an electrically conductive case and a capacitor roll disposed therein, said capacitor roll including an outer foil layer, said conductive case being spaced from said outer foil layer and disposed in capacitive relation therewith, circuit means for connecting said pair of lamps in circuit with said high reactance transformer so that at least the voltage across said secondary winding is applied across said lamps, said circuit means including electrical leads connecting conductive case in circuit with one of the lamps so that the capacitance between said conductive case and said outer foil is connected in shunt across said one of the lamps.

No references cited.